United States Patent [19]

Takamatsu

[11] Patent Number: 4,916,681

[45] Date of Patent: Apr. 10, 1990

[54] APPARATUS FOR, AND METHOD OF, RECORDING UNDIVIDED COMPOSITIONS IN UNDIVIDED FORM ON A TWO-SIDED RECORDING MEDIUM

[76] Inventor: Tsutomu Takamatsu, c/o Pioneer Electronic Corporation, Tokorozawa Works, No. 2610, Hanazono 4-chome, Tokorozawa-shi, Saitama, Japan

[21] Appl. No.: 253,381

[22] Filed: Oct. 3, 1988

Related U.S. Application Data

[63] Continuation of Ser. No. 938,312, Dec. 5, 1986, abandoned.

[30] Foreign Application Priority Data

Dec. 5, 1985 [JP] Japan .................................. 60-274449

[51] Int. Cl.⁴ .......................... G11B 5/86; G11B 13/04
[52] U.S. Cl. ........................................ 369/14; 360/15; 369/85
[58] Field of Search ...................... 369/14, 85, 84, 32, 369/47; 360/15, 13, 74.4, 74.1, 72.2, 61, 63, 69

[56] References Cited

U.S. PATENT DOCUMENTS

| 4,167,026 | 9/1979 | Sambe et al. .......................... 360/15 |
| 4,280,159 | 7/1981 | Nakayama ........................... 360/137 |
| 4,339,776 | 7/1982 | Länger et al. ......................... 360/69 |
| 4,365,278 | 12/1982 | Takizawa et al. ................. 360/74.4 |
| 4,410,917 | 10/1983 | Newdoll ................................. 369/84 |
| 4,428,075 | 1/1984 | Hazel et al. .......................... 369/275 |
| 4,479,159 | 10/1984 | Kamei et al. ........................ 360/137 |
| 4,535,439 | 8/1985 | Satoh et al. ......................... 369/275 |
| 4,607,300 | 8/1986 | Aoyagi et al. ..................... 360/74.4 |
| 4,614,983 | 9/1986 | Usami .................................... 369/14 |
| 4,644,436 | 2/1987 | Unno ................................... 360/72.3 |
| 4,672,600 | 6/1987 | Balston et al. ...................... 369/14 |
| 4,689,699 | 8/1987 | Harigaya et al. ................. 360/74.4 |

FOREIGN PATENT DOCUMENTS

| 0054438 | 6/1982 | European Pat. Off. ............ 369/275 |
| 58-133656 | 8/1983 | Japan .................................. 360/74.4 |
| 59-38940 | 3/1984 | Japan ..................................... 369/14 |

Primary Examiner—Steven L. Stephan
Assistant Examiner—Hoa Nguyen

[57] ABSTRACT

A CD system in which position information of different pieces recorded on the CD is used to calculate how many of the pieces can be recorded on one side of a tape. When the maximum number of recordable pieces have been played, the tape is reversed. The invention also allows the pieces to be evenly divided between the two sides of the tape.

8 Claims, 6 Drawing Sheets

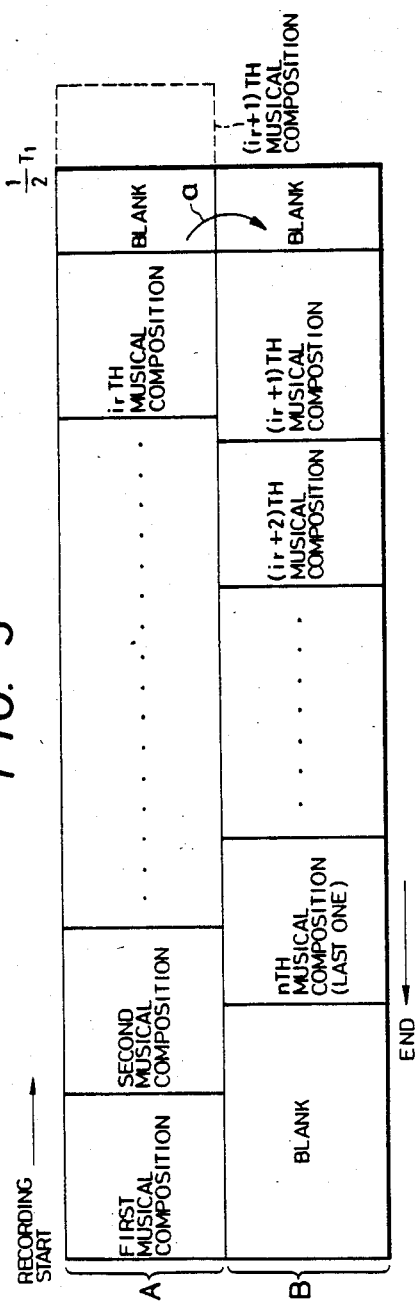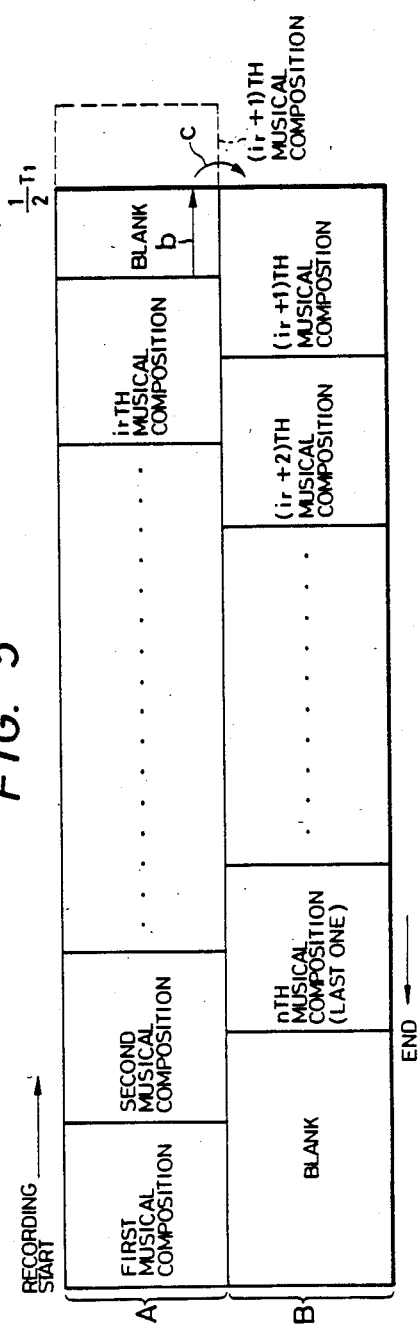

APPARATUS FOR, AND METHOD OF, RECORDING UNDIVIDED COMPOSITIONS IN UNDIVIDED FORM ON A TWO-SIDED RECORDING MEDIUM

This is a continuation of application Ser. No. 938,312, filed Dec. 5, 1986, now abandoned.

BACKGROUND OF THE INVENTION

1. Field of the Invention

The present invention relates to a digital audio disk reproducing system, and more particularly relates to a system for reproducing information recorded on a digital audio disk which is known by the name of a compact disk.

2. Background of the Invention

An audio output of a conventional digital audio disk reproducing system (hereinafter referred to as a player system) may be supplied to, for example, an automatically reversible cassette deck in order to reproduce musical compositions recorded on a digital audio disk (compact disk) to rerecord them on one side, for example the A-side, of a magnetic tape loaded in the cassette deck. In this case, the running direction of the magnetic tape is automatically reversed when the recording operation is continued to the end of the A-side of the tape. Upon reversal, the recording continues on the B-side.

Accordingly, audio signals reproduced during the operation of reversing the tape are not recorded, so that when the music compositions recorded on the tape by the rerecording operation, a music composition results having an unrecorded part which appears as an attendant distraction. For this reason, the user should previously search the length of the tape as well as the time required for playing the musical compositions, should judge how many musical compositions can be recorded on the A-side, and should reverse the running direction of the tape by a manual operation when the recording of the maximum number of the music compositions possible to be recorded on the A-side has been finished. In short, in the conventional system there exists such a problem that complicated handling is required.

SUMMARY OF THE INVENTION

Accordingly, an object of the present invention is to provide a digital audio disk player system in which excellent rerecording can be automatically made without any complicated handling.

The digital audio disk player system according to the present invention is arranged such that the arrival of an information detection point of a pickup at a non-recording portion of the disk is detected by means of positional information representing the position of the non-recording portion so as to generate a non-recording portion detection signal.

According to the invention, reversing the running direction of the tape can be prevented during the reproduction of any one of musical compositions recorded on a digital audio disk so that excellent rerecording can be automatically made without the occurrence of a music composition having a part not recorded. Accordingly, there is resulted an apparatus for, and method of, recording compositions in an undivided form, from a digital audio disk onto a two-sided recording medium.

According to one embodiment of the present invention, there is disclosed an apparatus for recording compositions in undivided form, from a digital audio disk onto a two-sided recording medium, said apparatus comprising:

data means for obtaining data corresponding to a cumulative playing time for a multi-composition program which is to be recorded, individual playing times for respective compositions in said program, and a playing length of a recording medium; and control means for utilizing said data from said obtaining step to calculate and automatically record a first group of said compositions on a first side of said recording medium, and a second group of said compositions on a second side, such that each respective composition is recorded as an undivided composition on a single side of said recording medium.

According to another embodiment of the invention, there is diclosed a method of recording compositions in undivided form, from a digital audio disk onto a two-sided recording medium, said method comprising the steps of:

obtaining data corresponding to a cumulative playing time for a multi-composition program which is to be recorded, individual playing times for respective compositions in said program, and a playing length of a recording medium; and utilizing said data from said obtaining step to calculate and automatically record a first group of said compositions on a first side of said recording medium, and a second group of said compositions on a second side, such that each respective composition is recorded as an undivided composition on a single side of said recording medium.

Other features and advantages of the invention will be apparent from the following description taken in connection with the accompanying drawings.

BRIEF DESCRIPTION OF THE DRAWINGS

The above and other related objects and features of the invention will become more apparent in the following description and accompanying drawings in which:

FIG. 3 is a diagram showing the state of musical compositions rerecorded on a tape by the operation shown in the flow chart of FIG. 2;

FIG. 5 is a diagram showing the state of musical compositions rerecorded on a tape by the operation shown in the flow chart of FIG. 4;

DETAILED DESCRIPTION OF THE PREFERRED EMBODIMENTS

Figure 1:
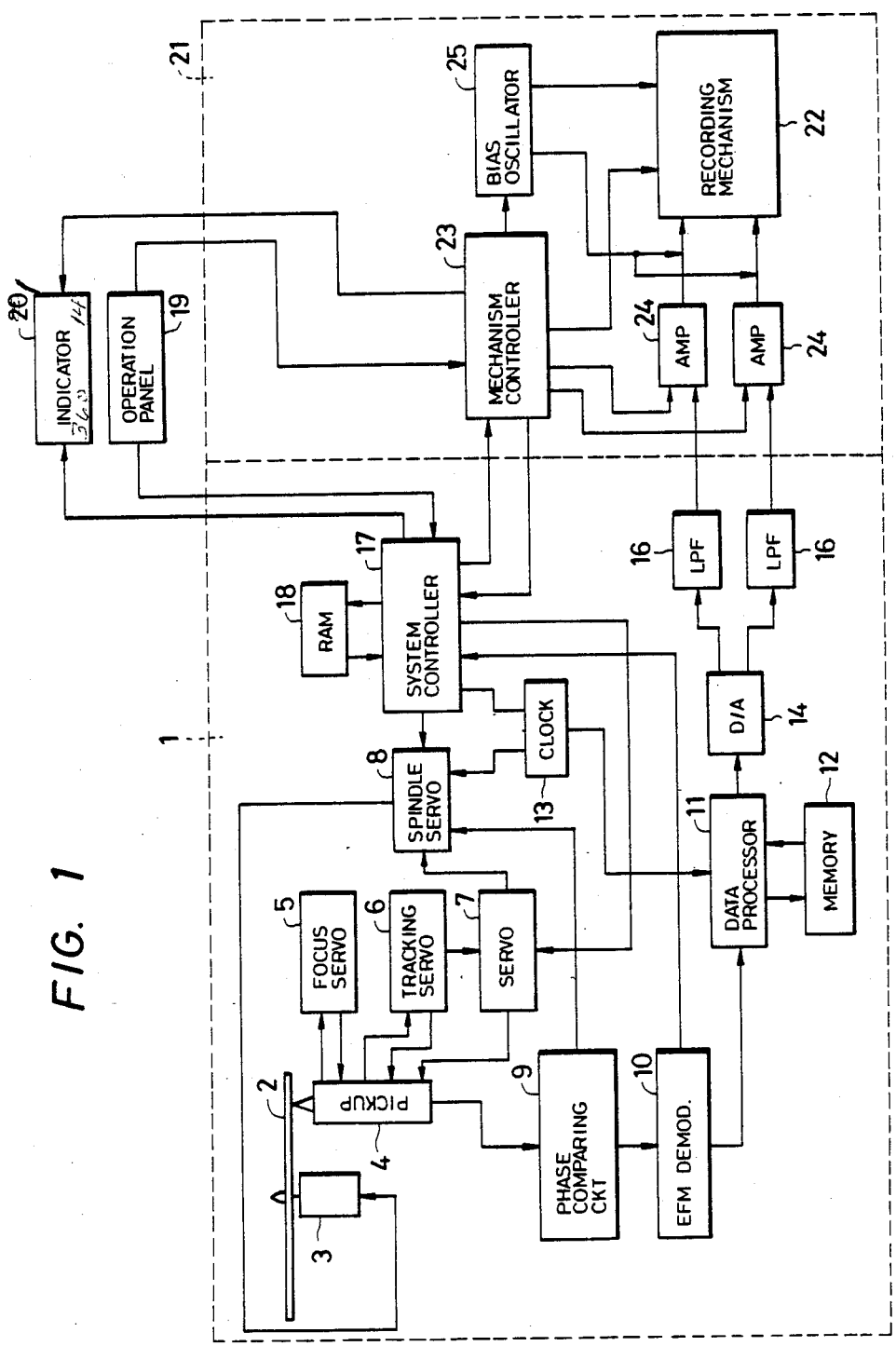
FIG. 1 is a block diagram showing an embodiment of the player system according to the present invention.

Referring to the drawings, embodiments of the present invention will be described hereunder.

In FIG. 1, a player section 1 is arranged such that information recorded on a digital audio disk 2 rotated by a spindle motor 3 is read by an optical pickup 4. The optical pickup 4 is incorporated with a laser diode, an objective lens, a focus actuator, a tracking actuator, a photodetector, etc. The output of the pickup 4 is supplied to each of a focus servo circuit 5, a tracking servo circuit 6, and a phase comparing circuit 9 including an RF-amplifier. In the focus servo circuit 5, a focus error signal is generated and the focus actuator in the pickup is operated corresponding to the quantity of the focus error. In the tracking servo circuit 6, a tracking error signal is generated and the error component is supplied to both the tracking actuator in the pickup and a servo circuit 7 for feeding the pickup. In response to the output of the pickup feed servo circuit 7, the pickup 4 is moved in the radial direction of the disk 2.

A phase difference between a reproduction clock signal generated by the phase comparing circuit 9 and a reference clock signal from a clock generating circuit 13 is detected by a spindle servo circuit 8, and the spindle motor 3 is driven in accordance with the phase difference so that the tracking speed of the recording disk 2 is kept constant. The output of the phase comparing circuit 9 is supplied to an EFM (eight-to-fourteen modulation) demodulating circuit 10 including a frame synchronizing circuit. The demodulated output is processed by a data processing circuit 11 for performing deinterleaving, error detection, correction, compensation, and the like, for the demodulated signal. The processed signal is temporarily stored in a data storage 12. The stored signal is then read out in accordance with the fixed period clock signal from the clock generating circuit 13, and converted into an analog signal by a D/A (digital-to-analog) converter 14. The respective outputs of the D/A converter 14 are supplied as a left-channel and a right-channel audio signal to a deck section 21 through two respective LPFs (lowpass filters) 16.

On the other hand, a control signal contained in the data from the demodulating circuit 10 is supplied to a system controller 17 which is arranged to read various kinds of information, for example, "in music", "out of music", "program number", "audio mute", "playing time", etc. The system controller 17 is constituted by a single microcomputer or a plurality of microcomputers and is arranged to respond to a key input entered by an operation panel 19 as well as a control signal applied from a mechanism control circuit 23 of the deck section 21 to thereby supply data to an indicator 20 as well as the mechanism control circuit 23 and supply various instructions to the pickup feed servo circuit 7, the spindle servo circuit 8, and the D/A converter 14. There is further provided a RAM (random access memory) 18 for storing information from the system controller 17.

In the deck section 21, the left and right audio signals supplied from the player section 1, after being amplified by respective recording amplifiers 24, are biased by an oscillator circuit 25 and supplied to recording heads disposed in a recording mechanism portion 22.

In the microcomputer constituting the system controller 17, a processor arranged to operate according to a predetermined program stored in a ROM (read-only memory) performs processing in such a manner as follows.

Figure 2:
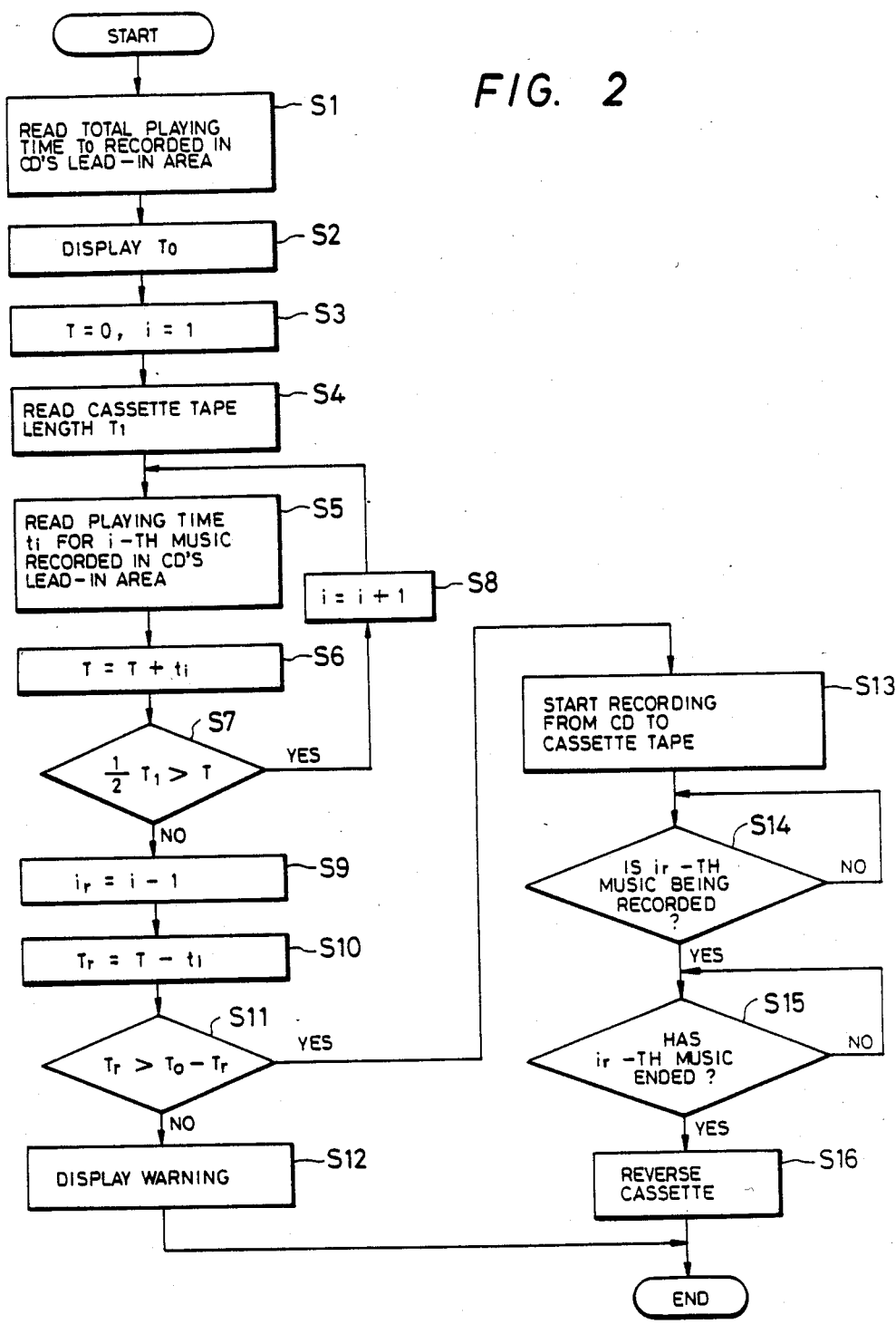
FIG. 2 is a flow chart showing an example of the operation of the player system of FIG. 1.

When a record starting command is given to the processor by the key operation of the operation panel 19 during execution of a main routine thereof, the processor reads the data as to the total playing time $T_0$ among various kinds of information recorded in the read-in area of the disk 2 (step S1 of FIG. 2). Next, the processor supplies the data of total playing time $T_0$ to the indicator 20 (step S2 of FIG. 2). Next, the processor initializes the contents in specific addresses in the RAM 18 for storing the data representing the accumulative playing time T and the program number i (in step S3 of FIG. 2). Then, the processor takes in the data representing the tape length, that is, the recordable time $T_l$ (C45, C60, C90, etc.) in both tape directions, generated by the key operation of the operation panel 19, or the like, (in step S4 of FIG. 2). Next in step S5 the processor reads the data of the playing time $t_i$ required for the music of the program number i. This playing time $t_i$ is among various kinds of information recorded in the read-in area of the disk 2. Next, the processor adds the playing time $t_i$ to the accumlated playing time T stored in a predetermined address of the RAM 18 (step S6 of FIG. 2). Next, in step S7, the processor judges whether half of the total tape length $T_l$ is larger than the accumulated playing time T to thereby judge whether the musical compositions up to the program number i can be recorded on one of the two recording surfaces (or recording areas) of the tape or not. When this test shows that $T_l/2$ is larger than T, or in other words shows that the musical compositions up to the program number i can be recorded, the processor in step S8 increments (adds one to) the program number i stored in another predetermined address of the RAM and then returns to step S5 to repeat the processing sequence.

On the other hand, if the test proves that the tape-length $T_l/2$ is not larger than the accumulated time T, or in other words proves that the musical compositions up to the program number i cannot be recorded, the processor stores the data representing the preceding program number $i_r$, that is, (i−1), of the last musical piece that can be completely recorded on the one recording surface of the tape into a predetermined address of RAM (step S9). Next, the processor calculates the playing time $T_r$ required for reproducing the musical compositions from the initial piece to that of the program number $i_r$ by subtracting the playing time $t_i$ (which will not be recorded) for the musical composition of program number i from the accumulated playing time T (step S10). Next, in step S11, the processor judges whether the playing time $T_r$ is larger than the time ($T_0 - T_r$) required for recording all the remaining musical compositions, that is, from program number $i_r$ to end of the CD.

When the judgement proves that the remaining playing time ($T_0 - T_r$), is larger than the preceding playing time $T_r$, the processor gives the indicator 20 an instruction to indicate that the recording cannot be performed for all the musical compositions (step S12) and then the processor performs the execution of the main routine again.

On the other hand, if the judgement proves that the preceding playing time $T_r$ is larger than the remaining playing time ($T_0 - T_r$), the processor starts the reproducing operation for the musical compositions recorded in the program area of the disk 2 and at the same time gives a record starting instruction to the control circuit 23 of the deck section 21 (step S13). Next, the processor fetches the program number of the musical composition which is being reproduced at present and compares the fetched program number with the program number $i_r$ (in the step S14 of FIG. 2). When the program number of the musical composition which is being reproduced at present coincides with the program number $i_r$, the processor fetches the currently elapsed playing time $t_r'$ for the musical composition of the program number $i_r$ among the information in the program area and compares the fetched elapsed playing time $t_r'$ with the playing time $t_r$ of the musical composition of the program number $i_r$ already read-in from the lead-in area(step S15). When the elapsed playing time $t_r'$ coincides with the playing time $t_r$, the processor generates a non-record detection signal as a reversing instruction to be supplied to the mechanisum control circuit 23 of the deck circuit 21 (in the step S16) and then performs the execution of the main routine.

Through the above-mentioned processing, musical compositions as shown in FIG. 3 are recorded on the tape. In other words, all the musical compositions from the first one to the $i_r$-th one are recorded on one side A of the two recording surfaces of the tape and a non-recorded band is formed from the position corresponding to the end of the $i_r$-th musical composition to the end of the side A. All the music compositions from the $(i_r+1)$-th one to the last one are recorded on the other side B of the tape. Furthermore, an unrecorded band is formed from the beginning of the side B to the beginning of the $(i_r+1)$th musical composition because a reversing instruction as shown by the arrow is given when the reproduction of the $i_r$-th musical composition is finished.

Figure 4:
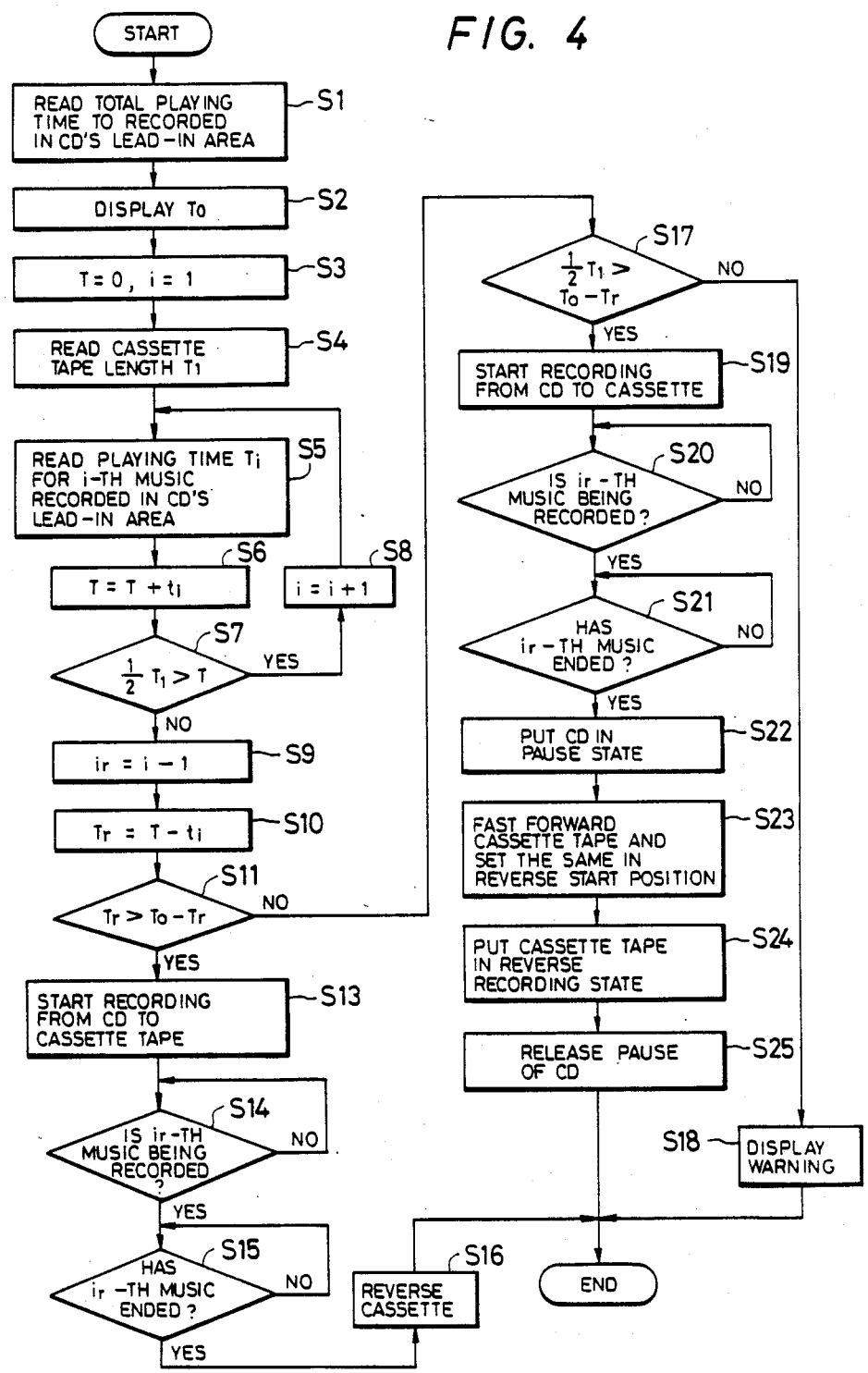
FIG. 4 is a flow chart showing another example of the operation of the player system of FIG. 1.

FIG. 4 is a flow chart showing another example of the operation of the system of FIG. 1. The operations in the steps S1–S11 and S13–S16 in this example, are the same as those in the flow chart of FIG. 2 and step S12 is omitted. Therefore the only the operations after step S17 will be described hereunder.

If the value of the preceding playing time $T_r$ is not larger than the value of the remaining playing time $(T_0 - T_r)$ in step S13, the processor compares the value of half the tape time, $T_{\frac{1}{2}}$, with the value of the remaining playing time $(T_0 - T_r)$ to thereby judge whether the musical compositions from the $(i_r+1)$-th one to the last one can be recorded on the other side of the tape (step S17 of FIG. 4). When the test proves that the value of $T_{\frac{1}{2}}$ is not larger than the value of $(T_0-T_r)$, in other words if all the musical compositions from the $(i_r+1)$-th one to the last one cannot be recorded on the other side of the tape, the processor gives the indicator 20 an instruction to indicate that not all the musical compositions can be recorded (step S18), and then the processor again performs the execution of the main routine.

On the other hand, if the value of $T_{\frac{1}{2}}$ is larger than the value of $(T_0 - T_r)$, in other words if all the musical compositions from the $(i_r+1)$-th one to the last one can be recorded on the other side of the tape, the processor performs the same processing in steps S19–S21 as that in the steps S13–S15. Both sequence of steps are for the A side of the tape. Then following step S21, when the $i_r$-th composition has been recorded on the A side, the processor brings the player section 1 into a pause state and then transmits a fast-feed instruction to the mechanism control circuit 23 of the deck section 21 (steps S22 and S23). Next, the processor transmits a recording start instruction to the mechanism control circuit 23 when the arrival of the head at the beginning of the other side of the tape is detected through the output of the mechanism control circuit 23 of the deck section 21, and the processor releases the CD player section 1 from its pause state (steps S24 and S25).

Through the above-mentioned processing, the musical compositions as shown in FIG. 5 are recorded on the tape. In other words, the musical compositions from the first one to the $i_r$-th one are recorded on one side A of the tape and a non-recorded band is formed from the position corresponding to the end of the $i_r$-th musical composition to the end of the side A. The musical compositions from the $(i_r+1)$-th one to the last one are recorded on the other side B of the tape. However, a nonrecorded band is not formed at the beginning of the side B, because the reversing operation as shown by the arrow c follows the fast-feed operation as shown by the arrow b after the recording of the $i_r$-th musical composition is finished.

The processing in the steps S14 and S15 of FIG. 2 or the steps S20 and S21 of FIG. 4 can be replaced by processing in which the total time $T_s$ from the beginning of the reproduction of the first musical composition of the information recorded in the program area of the disk 2 to the point in time where the reproducing is made at present is compared with the recording time $T_r$.

Figure 6:
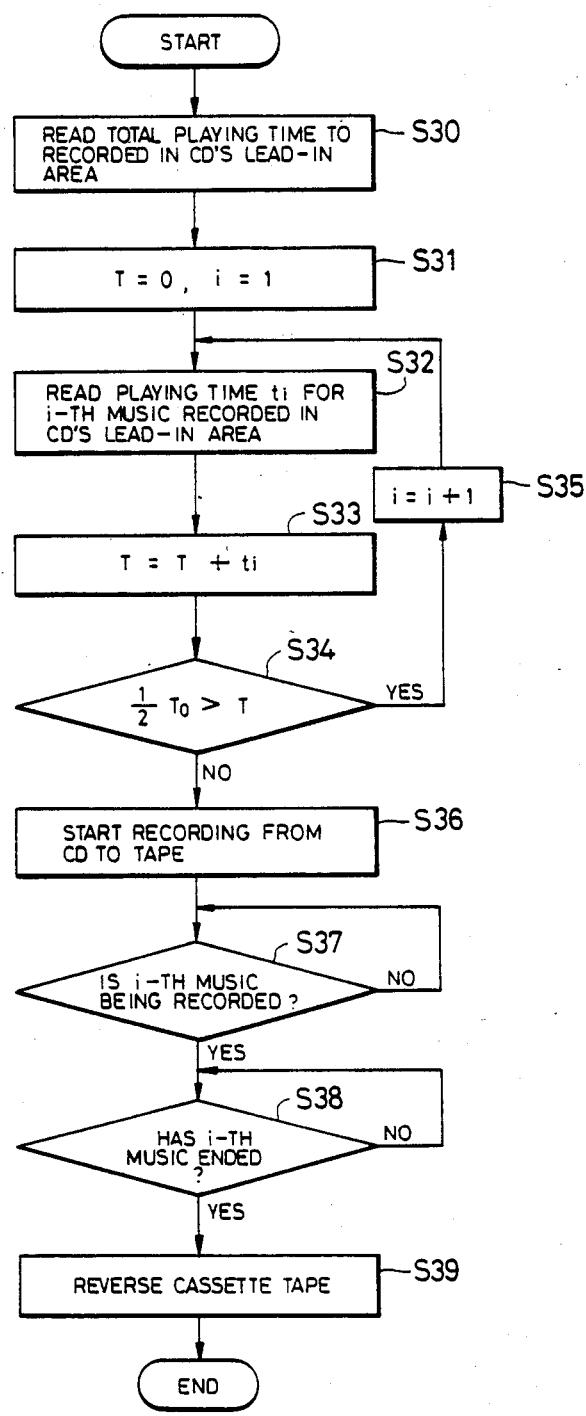
FIG. 6 is a flow chart showing a further example of the operation of the player system of FIG. 1.

FIG. 6 is a flow chart showing a further example of the operation of the system of FIG. 1. In this example, when a recording start instruction is given to the processor by the key operation of the operation panel 19 during the execution of the main routine thereof, the processor reads the data of the total playing time $T_0$ out of various kinds of information recorded in the read-in area of the disk 2 (step S30 of FIG. 6). Next, the processor stores "0" for the accumulated playing time T and "1" for the program number i in predetermined addresses of the RAM (step S32). Next, the processor reads the data of playing time $t_i$ for the i-th musical composition out of various kinds of information recorded in the read-in area of the disk 2 (step S32). Next, the processor adds the playing time $t_i$ to the accumulated playing time T stored in the predetermined address of the RAM 18 (step S33). Next, the processor compares half of the total playing time $T_0$ with the accumulated playing time T (step S34). If the value of half the playing time, $T_0/2$, is larger than accumulated time T, the processor adds one to the program number stored in the predetermined address of the RAM (in the step S35 of FIG. 6) and then returns to the step S32.

On the other hand, if the value of $T_0/2$ is not larger (i.e. less) than the value of T, the processor starts a reproducing operation for the musical compositions recorded in the program area of the disk 2 and at the same time gives a recording start instruction to the mechanism control circuit 23 of the deck section 21 (in step S36 of FIG. 6). Next, the processor fetches the program number of a musical composition which is being reproduced at present and compares it with the program number i (in step S37 of FIG. 6). If the program number of the musical composition which is being reproduced at present coincides with the number i, the processor fetches the elapsed playing time $t_i$ for the i-th musical composition out of the information in the program area and compares it with the playing time $t_i$ of the i-th composition (step S38). If the elapsed playing time $t_i'$ coincides with the playing time $t_i$, the processor generates a non-record detection signal as a reversing instruction to be supplied to the control circuit 23 of the deck section 21 (in step S39 of FIG. 6) and then performs the execution of the main routine again.

Figure 7:
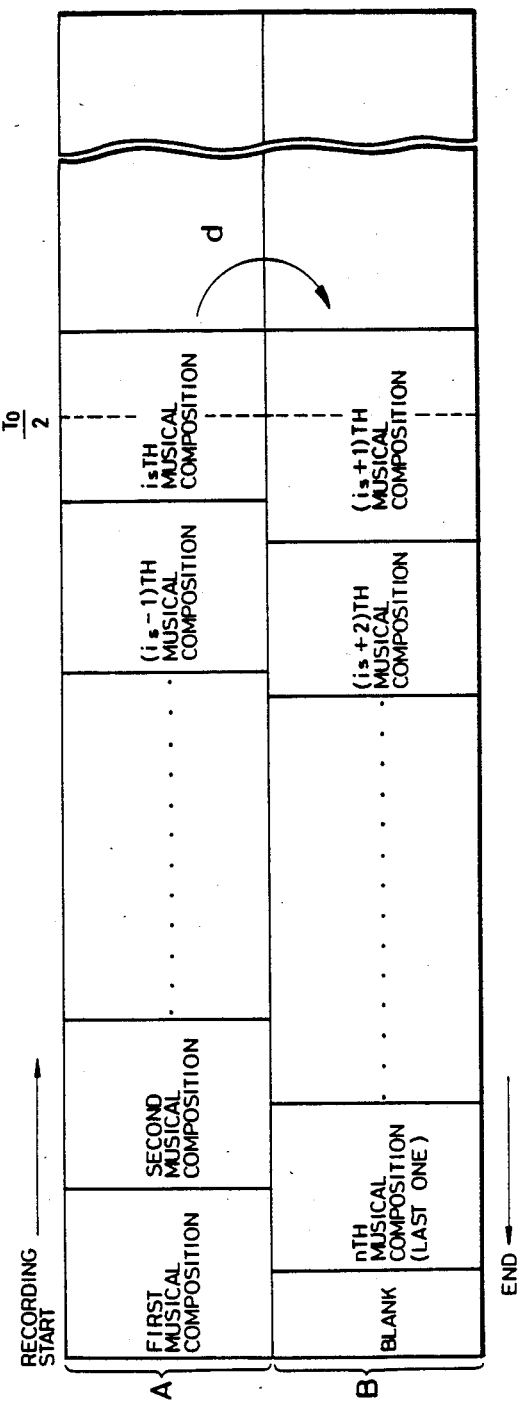
FIG. 7 is a diagram showing the state of musical compositions rerecorded on a tape by the operation shown in the flow chart of FIG. 6.

Through the above-mentioned processing, the musical compositions as shown in FIG. 7 are recorded on the tape. In other words, the musical compositions from the first one to the $i_s$-th one are recorded on one side A of the tape and a non-recorded band is formed from the position corresponding to the end of the $i_s$-th musical composition to the end of the side A. Herein, the $i_s$-th musical composition represents a musical composition which will be played when the total playing time $T_0$ is elapsed from the beginning of the playing of the first musical composition. The musical composition from the $(i_s+1)$-th one to the last one are recorded on the other side B of the tape. Furthermore, a non-recorded band is formed from the beginning of the side B to the position corresponding to the beginning of the $(i_s+1)$-th musical composition because the reversing operation as shown by the arrow d is made just after the recording of the $i_s$-th musical composition is finished.

Processing in the step S36 in the flow chart of FIG. 6 may be made immediately after step S30 to thereby perform the processing in steps 31 and following during recording in order to speed the operation. Furthermore, the processing in steps S37 and S38 in the flow chart of FIG. 6 can be replaced by a processing in which the total playing time from the beginning of the reproduction of the first musical composition to the point in time when reproducing is made at present, as derived from the information recorded in the program area of the disk 2, is compared with the total playing time T to the reversing position, as defined by step S33.

Although the description has been made as to a system in which a player section 1 and a deck section 21 are integrally provided, the present invention is applicable to a system having only a player 1.

In addition, though the description has been made in the above embodiments such that a non-record detection signal is generated when the elapsed playing time $t_r'$ coincides with the playing time $t_r'$, or when the elapsed playing time $t_i'$ coincides with the prerecorded playing time $t_i$, the system according to the present invention may be arranged to generate the non-record detection signal just before the time $t_r'$ or $t_i'$ coincides with the time $t_r$ or $t_i$, considering the delay in operation of the mechanism portion 22 of the deck 21.

What is claimed is:

1. An apparatus for recording compositions in an undivided composition, from a digital audio disk onto a two-sided recording medium, said apparatus comprising:
   data means for receiving and providing data corresponding to a cumulative playing time for a multi-composition program which is to be recorded, individual playing times for respective compositions in said program, and a playing length of a first or a second side of the two-sided recording medium; and
   control means for utilizing said data to calculate and automatically record a first group of said compositions on said first side of said recording medium, and a second group of said compositions on said second side of said recording medium such that each respective composition is completely recorded as said undivided composition on either one of said first or second side of said recording medium.

2. An apparatus as claimed in claim 1, wherein said control means comprises:
   first recording means for using data corresponding to said playing length of either of said first or second side of said recordingmedium to calculate and automatically record a maximum number of compositions which can be recorded as undivided compositions on said first side of said recording medium;
   signal means for recording, when said maximum number of compositions has been recorded on said first side, a signal for indicating a non-recording area to signal a reversing operation to said second side of said recording medium; and
   second recording means for automatically recording, on said second side of said recording medium, remaining ones of said compositions in said program which were not recorded on said first side of said recording medium.

3. An apparatus as claimed in claim 1, wherein said control means comprises:
   first recording means for using data corresponding to said playing length of either of said first or second side of said recording medium to calculate and automatically record a maximum number of compositions which can be recorded as undivided compositions on said first side of said recording medium;
   signal means for recording, when said maximum number of compositions has been recorded on said first side, a fast-forward detection signal to signal a fast-forward operation to the end of said first side of said recording medium; and
   second recording means for automatically recording, on said second side of said recording medium, remaining ones of said compositions in said program which were not recorded on said first side of said recording medium.

4. An apparatus as claimed in claim 1, wherein said control means comprises:
   first recording means for recording, on said first side of said recording medium, sequential undivided compositions in said program until an accumulated playing time of said undivided compositions recorded thus far is greater than one-half of said cumulative playing time for said program;
   signal means for recording, when said sequential undivided compositions have been recorded, a signal for indicating a non-recording area to signal a reversing operation to said second side of said recording medium; and
   second recording means for automatically recording, on said second side of said recording medium, remaining ones of said compositions in said program which were not recorded on said first side of said recording medium.

5. A method of recording compositions in an undivided composition, from a digital audio disk onto a two-sided recording medium, said method comprising the steps of:
   obtaining data corresponding to a cumulative playing time for a multi-composition program which is to be recorded, individual playing times for respective compositions in said program, and a playing length of a first or second side of the recording medium; and
   utilizing said data from said obtaining step to calculate and automatically record a first group of said compositions on said first side of said recording medium, and a second group of said compositions on said second side of the recording medium, such that each respective composition is completely recorded as said undivided composition on either one of said first or second side of said recording medium.

6. A method as claimed in claim 5, wherein said utilizing step comprises the steps of:
   using data corresponding to said playing length of said first or second side of said recording medium to calculate and automatically record a maximum number of compositions which can be recorded as undivided compositions on said first side of said recording medium;

generating, when said maximum number of compositions has been recorded on said first side, a signal for indicating a non-recording area to signal a reversing operation to said second side of said recording medium; and automatically recording, on said second side of said recording medium, remaining ones of said compositions in said program which were not recorded on said first side of said recording medium.

7. A method as claimed in claim 5, wherein said utilizing step comprises the steps of:

using data corresponding to said playing length of said first or second side of said recording medium to calculate and automatically record a maximum number of compositions which can be recorded as undivided compositions on said first side of said recording medium;

generating, when said maximum number of compositions has been recorded on said first side, a fast-forward detection signal to signal a fast-forward operation to the end of said first side of said recording medium; and automatically recording, on said second side of said recording medium, remaining ones of said compositions in said program which were not recorded on said first side of said recording medium.

8. A method as claimed in claim 5, wherein said utilizing step comprises the steps of:

recording, on said first side of said recording medium, sequential undivided compositions in said program until an accumulated playing time of said undivided compositions recorded thus far is greater than one-half of said cumulative playing time for said program;

generating, when said sequential undivided compositions have been recorded, a signal for indicating a non-recording area to signal a reversing operation to said second side of said recording medium; and automatically recording, on said second side of said recording medium, remaining ones of said compositions in said program which were not recorded on said first side of said recording medium.

* * * * *